Jan. 16, 1951 M. L. STUDEBAKER 2,538,482
TREATMENT OF CARBON BLACK
Filed May 27, 1946
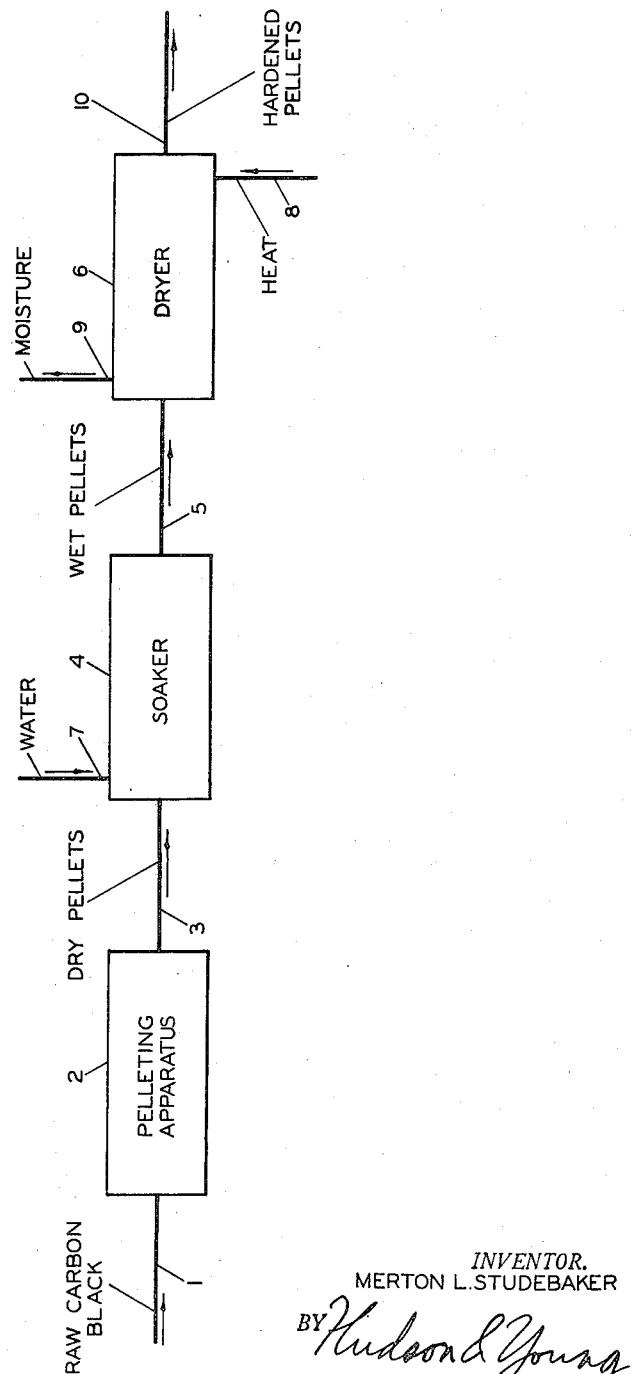
INVENTOR.
MERTON L. STUDEBAKER
BY Hudson & Young
ATTORNEYS Patented Jan. 16, 1951

2,538,482

UNITED STATES PATENT OFFICE 2,538,482

TREATMENT OF CARBON BLACK

Merton L. Studebaker, Bartlesville, Okla., assignor to Phillips Petroleum Company, a corporation of Delaware Application May 27, 1946, Serial No. 672,539

3 Claims. (Cl. 23—314)

This invention relates to the treatment of carbon black. In one of its more specific aspects it relates to a method for the manufacture of dustless, granules or pellets of carbon black, sufficiently hardened to withstand handling, packaging or shipment without undue breakage. In a still more specific aspect it relates to a method for hardening carbon black pellets.

In the manufacture of hardened carbon black pellets some processes involve the extrusion of a paste-like mixture of carbon black and water in which more or less cylindrical shaped pellets are formed. These pellets are further treated by a polishing operation which smooths end roughness and finally they are dried down to about 1.4 per cent or less moisture.

In another wet pelleting process dry flocculent black is vigorously agitated while water is sprayed into the moving mass. By the time about 100 pounds of water is added to 100 pounds of black spheroidal grains or pellets of black begin to form. This material is then dried and further compacted to form a more dense product.

Still another wet pelleting process involves the spraying of 48 per cent to 52 per cent water onto carbon black during its passage through a pellet mill. Following the pelleting the material is flash dried by exposure to hot gases. The drying is complete. Several other similar processes are known in which the black and water are agitated to form pellets and the pellets then dried.

I have found when carbon black is pelleted wet, or pelleted dry with subsequent addition of water, upon drying, the pellets are only little, if any, stronger than had no water at all been added. I have further found upon addition of water to carbon black pellets, that if subsequently dried to a predetermined water content, or if only a requisite amount of water is added, the moist pellets are relatively hard and resistant to breakage by shear or pressure when compared to dry pellets.

An object of my invention is to provide a process for making a hardened pelleted carbon black.

Another object of my invention is to provide a process for making carbon black pellets resistant to breakage during handling and transportation.

Still another object of my invention is to provide a process for making carbon black pellets hard and resistant to breakage during handling and bulk shipment.

Still other objects and advantages of my invention will be apparent to those skilled in the art from a careful study of the following disclosure and drawing which respectively describes and illustrates a preferred method of carrying out the process of my invention.

The drawing illustrates diagrammatically an apparatus in which the process of my invention may be practiced.

Referring to the drawing raw carbon black from a source of production or from storage, not shown, passes through a charge line 1 into a pelleting apparatus 2. From this apparatus pelleted carbon black may pass through a transfer line 3 or by other means into a soaker apparatus 4. An inlet pipe 7 communicates with the interior of the soaker apparatus 4 and is adapted for the passage of water, or steam or both from a source, not shown, into the soaker. From the soaker the pellets may pass by means 5 to a dryer 6, thence by a transportation means 10 to a tank car loading device or to a storage tank, not shown. Heat from a source, not shown, enters the dryer 6 through an inlet 8 and exits therefrom through an outlet 9.

The pelleting apparatus 2 forms no part of my invention but is shown merely to assist in forming a clearer understanding of the process of my invention. This pelleting apparatus may be substantially any type of pelleting apparatus which is suitable for forming pellets from a given type of carbon black. This pelleting apparatus may be a vertically disposed drum containing agitating means, or may be a horizontally disposed rotating drum or mill containing whatever inside parts or apparatus are required to promote pellet formation.

The pellets from the pellet mill, or from storage, as mentioned above, pass through a pipe or other conveyor means 3 into the soaker 4. In this vessel water from line 7 is added to the dry pellets. The water may be added in the form of liquid water, or in the form of a spray or mist, or in the form of steam, or a mixture of these. The main point is merely to add a considerable, yet limited amount of water to the carbon black pellets. I have found it preferable to add warm or hot water to the pellets in place of cold water or water even at atmospheric temperature since the warmer or the hotter the water the faster the carbon black pellets are wetted. The use of water at from 130° to 212° F. markedly increases plant capacities as compared to water at atmospheric temperature. While tap water or ordinary well water may be used I prefer to use rain water or other water relatively free from dissolved mineral salts. The proportions of water to be left in a carbon black pellet to give a pellet of maximum hardness will vary with the nature of the black, different blacks requiring different amounts of water.

When in soaker 4, pellets are soaked in water, means are provided for removing the pellets at a predetermined time. The soaker may be operated batchwise but I prefer a continuous operation. The soaked pellets then pass by way of a pipe or other conveyor means 5 into the dryer apparatus 6. This apparatus may be directly fired or heat passed therethrough by means of hot gases from pipe 8. I prefer to use a continuous rotary drum type dryer for this operation.

In this operation, I have found that hardened pellets result when the drying is so carried out as to leave from about 25 per cent to about 55 per cent moisture by weight in the pellets. Much more residual moisture than 55 per cent materially weakens the pellets and breakage in handling may be excessive.

In one series of experiments in which pellets were soaked in hot water, and the water drained off, the wet pellets were subjected to a drying operation. During the drying samples of pellets were removed at intervals to determine the relation of moisture to pellet hardness. Successive samples removed from main bulk of drying pellets contained 67 per cent, 54.7 per cent, 53.4 per cent, 51.0 per cent, 46.5 per cent, 42.6 per cent and 25.4 per cent moisture. A hardness test giving approximate results was run on these samples, along with a test on the original dry pelleted black, and two samples of commercially pelleted black. One of these latter two samples was a furnace black and one channel black. The samples were placed on a piece of paper and covered with a second paper. Then a 25½ pound smooth surfaced weight was placed on the paper. Upon removal of the weight and upper sheet of paper the pellet samples containing from 46.5 per cent to 53.4 per cent water appeared to be crushed considerably less than those pellets containing more moisture than 53.4 per cent and those containing less than 46.5 per cent. This upper moisture value, that is 53.4 per cent appeared to be more critical than less moisture. In support of this statement, the sample containing 54.7 per cent moisture was badly crushed while the one containing 67.0 per cent moisture appeared to be substantially completely crushed. This latter high moisture sample was much more nearly completely crushed than was the original unwetted sample. The 42.6 per cent sample had considerably more pellets crushed than did the 46.5 per cent sample, while the 25.4 per cent sample was badly crushed.

The moisture content of these samples was determined by placing a weighed amount of pellets in a moisture oven and after thoroughly drying, the dry samyles were again weighed. The loss in weight represented the moisture content.

As a check test to prove or to disprove the results of the above described "crushing" test, and to determine further resistance to breakage due to handling pellets of the above given moisture contents were thrown against surfaces of glass, of paper and of concrete. The breakage by throwing was in agreement with the breakage under the 25½ pound weight, that is, pellets containing from 46.5 per cent to 53.4 per cent moisture were most resistant.

In the operation of the dryer 6, a heated gas, air, flue gas, or substantially any other gas which could be heated to the desired temperature without decomposition, reaction or danger from explosion, could be used. When using air, care should be exercised since carbon black ignites rather easily.

A second embodiment of my invention involves the addition of such an amount of water that the drying step may be omitted. In this operation, the water may be added in the form of a finely divided or atomized spray, with or without steam. The rate of water addition may be based upon the rate of pellet charge to the soaker unit 4. For example, if 51 per cent moisture is desired in a hardened pellet product, then for each 49 pounds of pellet charge to the soaker 51 pounds of water may be added. With the addition of the water at a point near the inlet end of a rotating soaker mill, the pellets issuing from the outlet end contain a relatively uniform water content. In this case the drying step need not be used and the water containing but dry appearing pellets are hard and will resist breakage as compared to the original dry pellets.

In the operation of my process, I pass pellets from a pellet mill or from storage into the soaker 4 in which the pellets contact hot water, the excess of water is removed by any convienient means and the wet pellets dried to the required moisture content in the dryer 6. In the other embodiment, the required amount of water or water and steam is sprayed on the pellets in the soaker. The required amount of water is added to give pellets of a desired moisture content. The drying operation or step may be accordingly omitted.

I have found that in either the water immersion or spraying embodiments absorption of water by the normally hydrophobic pellets is expedited if the water used is maintained at a super atmospheric temperature, as between the limits of about 130° F. and 210° F. It is not necessary and in fact not advisable to use superheated steam since pellets contacting such steam will be heated considerably before condensation and moisture absorption can take place. Thus as a maximum temperature, I prefer to use say saturated steam or a steam and water mixture at atmospheric pressure, the temperature of which may be about 210° F. Even water alone at 200° F. or some lower is satisfactorily rapid for promoting absorption into the carbon black pellets. Water at as low a temperature as 130° F. may be used.

In the spraying operation, the soaker vessel may well be maintained relatively tight so as to be able to maintain a sufficiently humid atmosphere therein to assist in promoting the rapid absorption of the water.

I have found that the advantage in the herein described water hardening of carbon black pellets is more pronounced the more hydrophobic the original dry pellets.

One important and unexpected point to be realized in the practice of my process is that carbon black pellets containing as much as 55 per cent or even more moisture feel dry and are dry in appearance. If some pellets are moistened as herein disclosed then completely dried, their increased hardness and increased resistance to shear breakage are lost and the pellets then appear to possess about the same properties as they had before they were water hardened.

Materials to be used in the construction of a carbon black pellet hardening plant as herein disclosed, should be selected from among those that are resistant to the corrosive nature of carbon black and water mixtures.

It will be obvious to those skilled in the art that variations and alterations in the conditions of my basic process may be made and yet remain within the intended spirit and scope of my invention.

Having disclosed my invention, I claim:

1. A process of making carbon black pellets sufficiently hard to withstand bulk shipment comprising agglomerating dry flocculent hydrophobic furnace carbon black into fully formed pellets of a predetermined size range by dry agitation of the flocculent carbon black, transferring the fully formed pellets of said predetermined size range to a soaking zone and contacting said pellets in said zone without further agglomeration and growth of said pellets with more water than the pellets can absorb, transferring the soaked pellets to a drying zone and therein drying said pellets without further agglomeration and growth so that the final pellets contain between 46.5 and 55 per cent by weight of moisture and are still of said predetermined size range.

2. A process of making carbon black pellets sufficiently hard to withstand bulk shipment comprising agglomerating dry flocculent hydrophobic furnace carbon black into fully formed pellets of a predetermined size range by dry agitation of the flocculent carbon black, transferring the fully formed pellets of said predetermined size range to a soaking zone and mixing said pellets in said zone without further agglomeration and growth of said pellets with water between 130° F. and 210° F. in an amount sufficient to produce pellets containing 25 to 55% by weight of water.

3. A process of making carbon black pellets sufficiently hard to withstand bulk shipment comprising agglomerating dry flocculent hydrophobic furnace carbon black into fully formed pellets of a predetermined size range by dry agitation of the flocculent carbon black, transferring the fully formed pellets of said predetermined size range to a soaking zone and mixing said pellets in said zone without further agglomeration and growth of said pellets with water in an amount sufficient to produce pellets containing 25 to 55% by weight of water.

MERTON L. STUDEBAKER.

REFERENCES CITED

The following references are of record in the file of this patent:

UNITED STATES PATENTS

| Number | Name | Date |
|---|---|---|
| 2,121,535 | Amon | June 21, 1938 |
| 2,131,686 | Heller et al. | Sept. 27, 1938 |
| 2,213,059 | Teegerstrom | Aug. 27, 1940 |
| 2,228,704 | Offutt | Jan. 14, 1941 |
| 2,306,698 | Heller | Dec. 29, 1942 |